No. 830,209. PATENTED SEPT. 4, 1906.
DE WITT C. CONKLING & J. E. WINN.
AUTOMATIC TRANSFORMER CUT-OUT.
APPLICATION FILED NOV. 14, 1904. RENEWED FEB. 17, 1906.
3 SHEETS—SHEET 1.
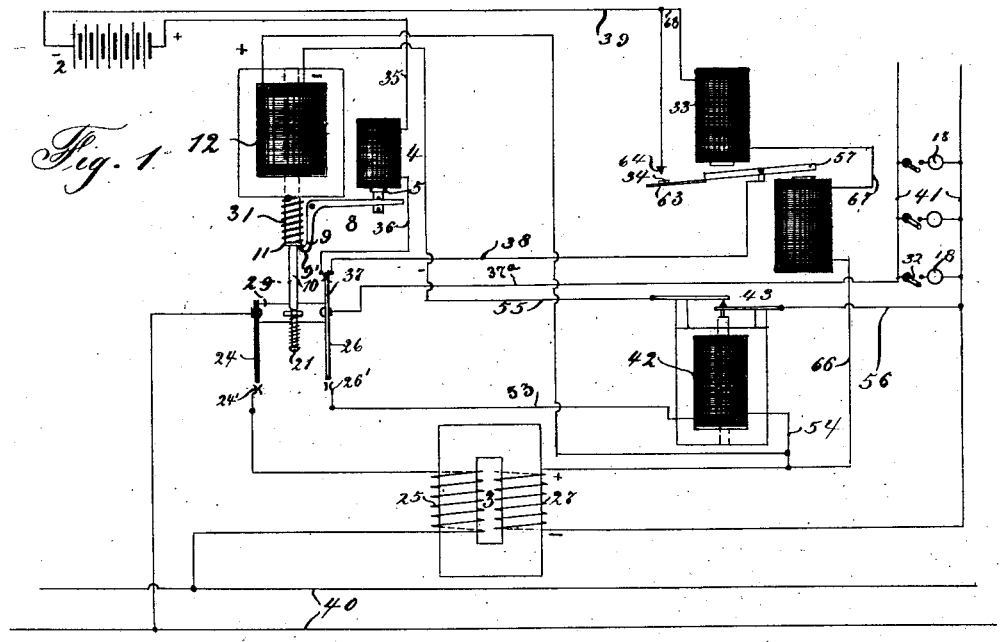
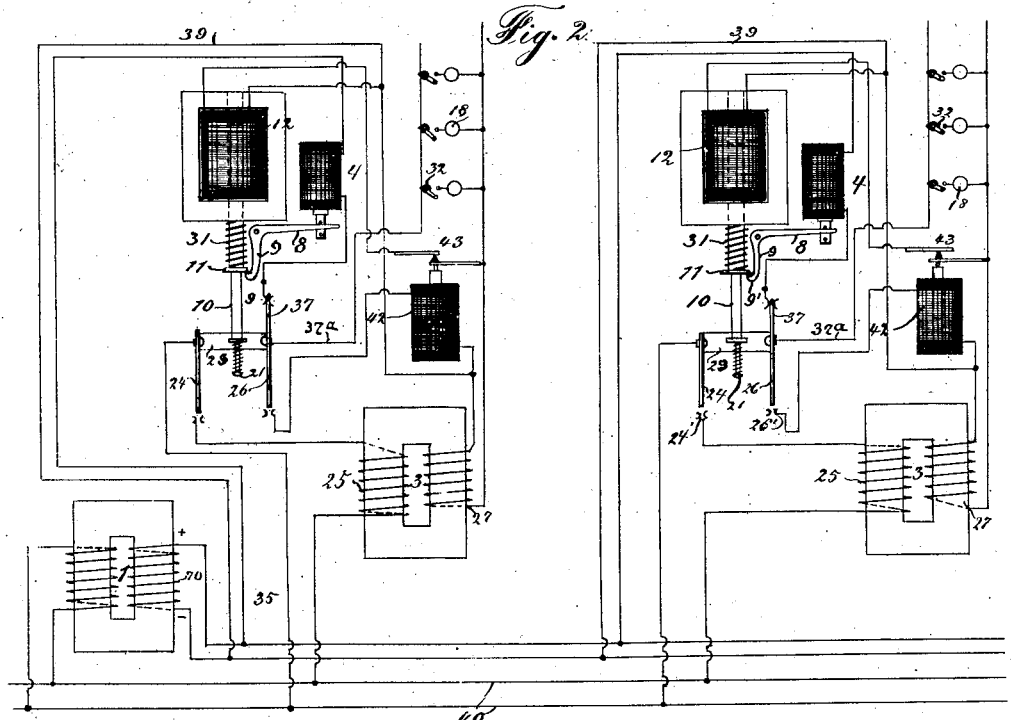

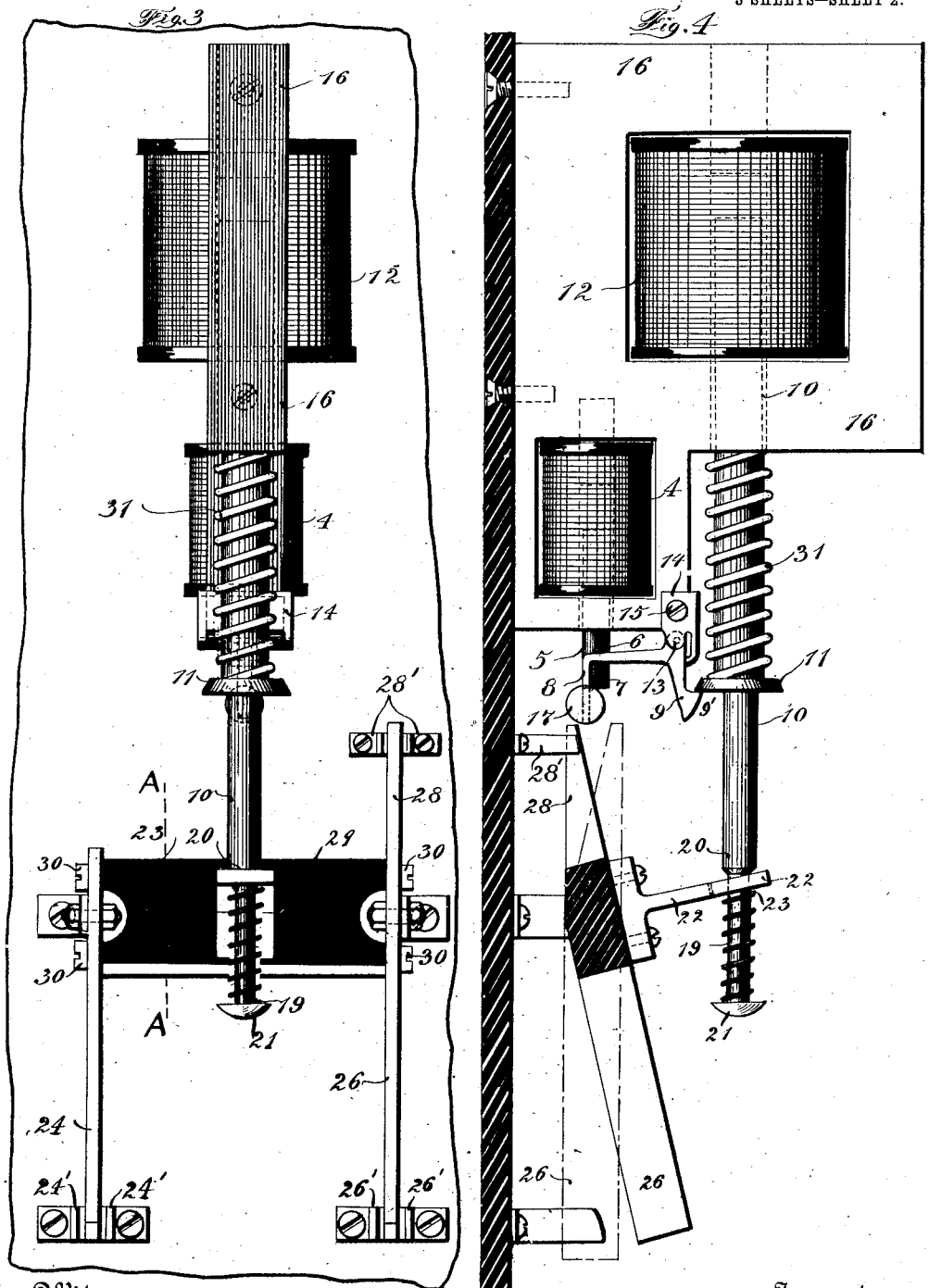

No. 830,209. PATENTED SEPT. 4, 1906.
DE WITT C. CONKLING & J. E. WINN.
AUTOMATIC TRANSFORMER CUT-OUT.
APPLICATION FILED NOV. 14, 1904. RENEWED FEB. 17, 1906.
3 SHEETS—SHEET 3.
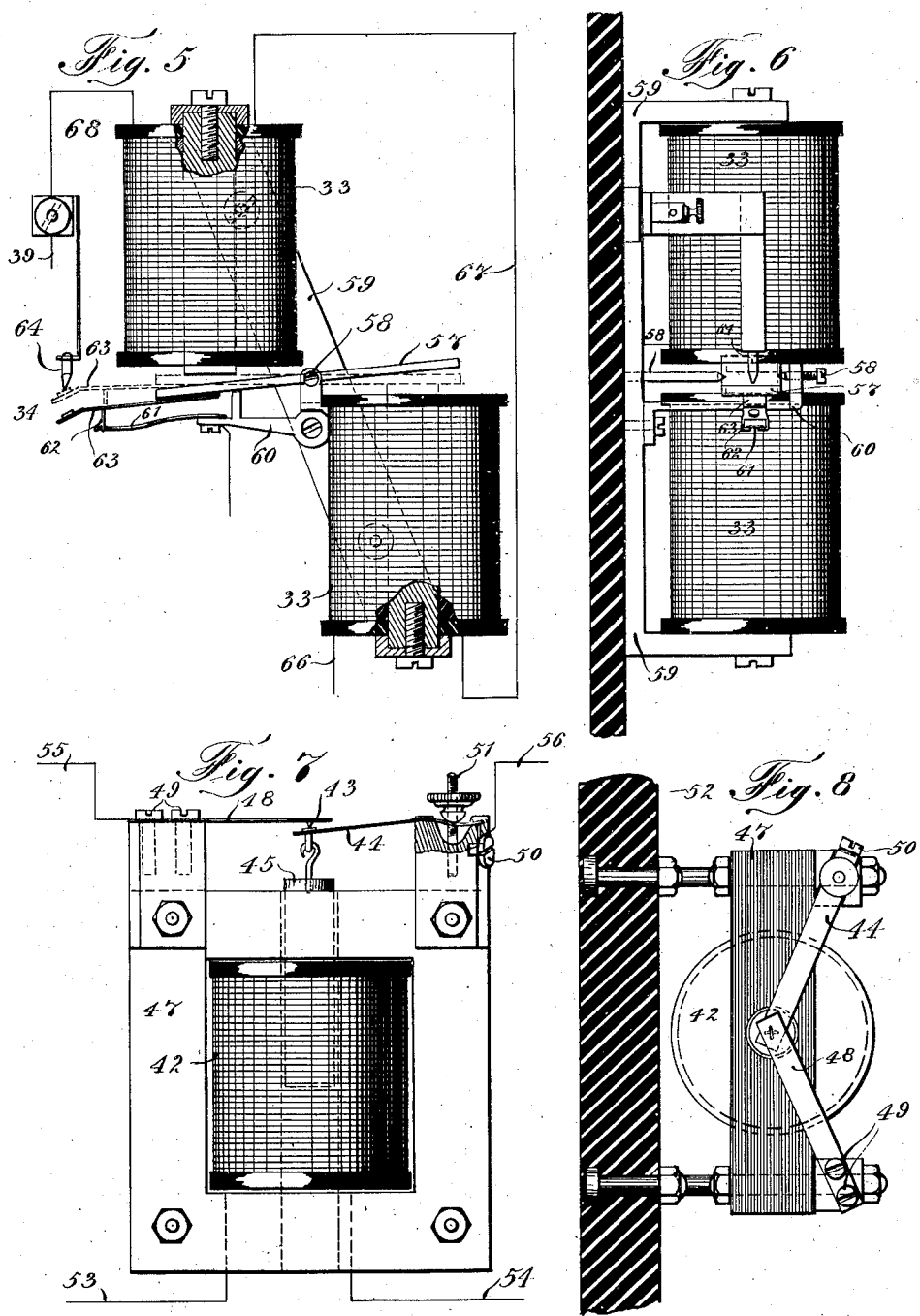
Witnesses
W. G. Bergman
F. Harms
Inventors
De Witt C. Conkling
John E. Winn
By Their Attorney
Edward P. Thompson

UNITED STATES PATENT OFFICE.

DE WITT C. CONKLING, OF HOBOKEN, AND JOHN E. WINN, OF WEEHAWKEN, NEW JERSEY, ASSIGNORS TO ELECTRIC ECONOMIES COMPANY, A CORPORATION OF SOUTH DAKOTA.

AUTOMATIC TRANSFORMER-CUT-OUT.

No. 830,209.            Specification of Letters Patent.            Patented Sept. 4, 1906.

Application filed November 14, 1904. Renewed February 17, 1906. Serial No. 301,634.

*To all whom it may concern:*

Be it known that we, DE WITT C. CONKLING, a resident of Hoboken, and JOHN E. WINN, a resident of Weehawken, in the county of Hudson, State of New Jersey, citizens of the United States of America, have invented certain new and useful Improvements in an Automatic Transformer Cut-Out, of which the following is a specification.

Our invention relates to means for automatically switching in and out the primary and secondary currents of the transformers by the respective action of turning on and off the electric lamps or other translating devices in a system of electrical distribution where an alternating-current generator supplies a main line, and said transformers convert the electromotive force to a higher or lower voltage, the object being to save core loss in the transformers when no translating devices are closed on secondary.

By our invention we accomplish the cutting out of the transformer-coils by the action of the alternating current itself. Heretofore cutting out has been obtained by a spring, gravity, or some force other than the alternating current, thereby making the system by the old method undesirable for electric-light plants, for when the main line breaks down the lights are not automatically operated again as soon as the line is repaired. By our system in such accidents as soon as a current passes over the main line again the lamps are instantly and automatically relighted.

Our invention also includes the apparatus for securing these results without regard to the scope of the invention, which is attended to in the claims. The general conception underlying the organization comprises an alternator, a transformer, an electromagnetic cut-out for the coils thereof and operated by the current of the secondary coil, and a controller for the cut-out for maintaining the cut-out circuit broken as long as a translating device is in a closed circuit with said secondary coil.

Figure 1 is a diagram of one form of system. Fig. 2 is a diagram of another form of system. The circuits may be traced to and through all the apparatus. Fig. 3 is a front elevation of the electromagnetic devices for switching in and out the coils of the transformer. Fig. 4 is a side elevation of the same devices with one of the front parts removed by a section through a line A A. Fig. 5 is a front elevation of the relay. Fig. 6 is a side elevation of the same relay mounted upon a plate. Fig. 7 is a front elevation of an electromagnetic circuit-closer for holding the transformer cut-out device in a required phase. Fig. 8 is a top view of that shown in Fig. 7, mounted upon a plate.

The main difference between the systems in Figs. 1 and 2 consists in the use of the pilot-transformer 1 in place of the battery 2 in Fig. 1, which latter may consist of only enough cells to give four or more volts, the battery representing, for example, seven Daniell's cells. The function of this battery is to furnish a small current for starting the apparatus that switches in a transformer 3.

As the current from the battery 2 must pass through the high resistance of an incandescent electric lamp, in those cases where such lamps are the translating devices the current is too weak to operate an ordinary electromagnetic device, and hence this current is employed to actuate a relay which in turn includes the battery directly in circuit with the electromagnetic device. The function of the pilot-transformer 1 is the same as that of the battery 2; but of course no relay will be necessary and is therefore an advantage; but there are also advantages in having a few cells of battery instead of a pilot-transformer. For example, in isolated locations copper is saved in circuits leading from the pilot-transformer to the various substations.

We will now explain the construction and then the operation of the organization for switching in the primary and secondary coils of the transformer 3 in the system shown in Fig. 1. 4 represents a releasing or tripping "solenoid," so called because it permits a transformer-switch to close the primary and secondary circuits of the transformer-coils by the action of a spring. The mechanism involved consists of the core 5, belonging to the solenoid 4 and having two pins 6 and 7 projecting therefrom to serve as a kind of fork between whose tines extends one arm 8 of a catch, whose other arm 9 normally holds up a rod 10 by pressing upon the lower surface of a collar 11, fixed upon the rod 10, which is a core of a "cut-out solenoid" 12, so called because when energized it cuts out the transformer-coils of the transformer 3. The catch is pivoted at the pivot 13 to a bent plate 14, whose construction is not essential to an understanding of the invention further than to say this bearing-plate is supported by means of a screw 15 to the laminated external core 16, which is common to the solenoids 4 and 12.

17 is a weight for balancing the arms 8 and 9 as desired—namely, so that the arm 8 is definitely heavier than the arm 9. Normally the pin 6 rests upon the upper surface of the horizontal portion of the arm 8, which is bent downward at a point as measured beyond the point 6 from the pivot 13. The pin 7 is so located as not to strike the arm 8 until the core 5 has traveled upward through a greater portion of its stroke for striking the arm 8 with a hammer effect or blow. By "normally," as used herein, I mean the condition of the system when all the incandescent electric lamps 18 are excluded from an electric circuit. The arm 10 has at its lower end an extension 19 of reduced diameter forming a shoulder 20 and terminated by a head 21 and passing through a hole in a switch-arm 22. There is a spring 23 surrounding the extension 19 and extending from the head 21 to the arm 22, and with the coils sufficiently apart to be compressed and jammed together when the rod 10 rises. This arm 22 is rigidly connected mechanically to the switch 24 for closing and opening the primary coil 25 of the transformer 3 and to the switch 26 for opening and closing the secondary coil 27 of the transformer 3 and to the switch 28 for opening and closing the circuit of the solenoid 4. The switches 24 and 26 are connected rigidly by and attached to an insulator 29 by screws 30, so that when the arm 22 is moved up and down the switches 24, 26, and 28 are operated. There is a spring 31 normally under compression and tending to throw down the collar 11, together with the rod 10. The arm 9 of the catch prevents this downward movement when the nose 9' of the catch is under the collar 11.

Referring to Fig. 1, the operation for switching in the transformer 3 for supplying the lamps 18 is as follows: Only one of the lamps 18 may be thrown into circuit by a circuit-closer 32; but no current from the transformer will pass through the lamp absolutely instantly, although it will be lighted practically simultaneously. The current from the battery 2 may then circulate through the solenoid 4, conductor 37ª, the included lamp 18, secondary coil 27, conductor 66, the relay-magnet 33, through conductors 68 and 39 to the other pole of the battery 2. This weak current closes the contacts at 34 belonging to the relay, and thereby the current of the battery may pass through the solenoid 4 and contacts 34 without going through the high-resistance lamp 18, the circuit being first through the conductor 35, then through the solenoid 4, then through the conductor 36, then through the circuit-closer 37, then through the conductor 38, the contacts 34, the conductor 39 to the pole of the battery 2. This battery-current energizes the solenoid 4, which lifts its core 5, whose pin 7 lifts the arm 8 by a sharp blow thereon and removes the nose 9' from under the collar 11, thereby releasing the rod 10, which is driven down so that the shoulder 20 pushes down the arm 22 and closes the switches 24 and 26, thereby including, respectively, the primary and secondary coils 25 and 27, the former with the main line 40 and the latter with the lamp-conductors 41 and a solenoid 42, which is for the purpose of holding open at the contacts 43 the cut-out solenoid 12 during the whole time that one or more of the lamps are in circuit with the secondary coil 27. Now the lamps 18 may be utilized, one or more at a time.

When the last lamp is turned off, the transformer 3 is automatically excluded from the circuit of the lamps of the main line in the following manner: When the last lamp is excluded, the circuit of the solenoid 42 is broken, and therefore the spring 44 lifts the core 45 of the solenoid 42 and closes the contacts 43, thereby including the coil 12 in circuit with the secondary coil 27, with the result of the lifting of the rod 10 quickly above the nose 9' and the opening of the switches 24 and 26 and the closing of the switch 28 by the rising of the arm 22. The detail action is as follows: When the rod 10 rises, the spring 23 is compressed until its coils are jammed against one another, causing the force which lifts the arm 22 sufficiently to withdraw the switches 24 and 26 from the spring-pressed terminals 24' and 26', where there is necessarily friction to be overcome. As soon as this release takes place, the recoil of the spring 23 lifts the arm 22 further, and thus applies the switch 28 to the terminals 28' for closing at that point the circuit of the solenoid 4 for subsequent use upon again lighting up the lamps.

A detailed construction of the controller for the "cut-out solenoid" 12 is shown in Figs. 7 and 8 and is so called because it controls the current of the solenoid 12 by maintaining the circuit thereof open at the contacts 43 while the lamps 18 are lighted and for closing the circuit at the same contacts as soon as all the lamps 18 are cut off.

The solenoid 42 has an external laminated core 47 connecting the poles of the solenoid, by which construction the device is more efficient for the purpose. One of the contacts 43 is a bar 48, fastened to the core 47 by screws 49, and the other contact is on the spring 44, which is fastened by a screw 50 upon the core 47. An adjusting screw and nut at 51 serve to regulate the pressure between the contacts 43. The whole device is mounted upon a vertical insulating-plate 52. When the solenoid 42 is energized even slightly, the core 45 is drawn down and the contacts 43 separated. The conductors 53 and 54 lead to the solenoid 42, and the conductors 55 and 56 lead to the contacts 43.

The relay has a nearly-balanced armature 57, fulcrumed at the central pivot 58, one arm of the lever thus formed being adapted to be attracted by the upper magnet 33 and the other arm by the lower magnet 33, which magnets have the yoke 59. 60 is a bracket carrying a spring 61, which bears at its outer end downward upon an extension 62 from a spring 63, that extends from the armature 57. The spring 61 is therefore a retractile for the armature 57, 64 is a contact-terminal in the path of the terminal 63. The wire 39 leads to one pole of the relay, and the wire 66 leads to the other pole. The two magnets 33 are connected by a wire 67, and the contact 64 is connected to the upper magnet 33 by the wire 68.

In Fig. 2 about the same explanation would apply as given to Fig. 1, except that the pilot-transformer is used instead of the battery 2. Several stations would be controlled by only one pilot-transformer. The figure shows two stations as an example of several. The secondary coil 70 is electrically connected to the solenoids 4 in such a manner that when a lamp 18 is turned on a current energizes one of the solenoids 4. This action throws in the transformers 3 in Fig. 2, the difference being mainly that no relay is necessary, for the electromotor force in the coil 70 is sufficiently high to properly energize the solenoids 4 through the resistance of the lamps 18.

As the word "magnet" is a generic term for any kind of coil, together with its armature or core, whether in the form of a solenoid or not, the term "magnet" is employed in the claims to designate any feature shown in the drawings consisting of an electric coil and a piece of iron to be attracted to the same.

We claim as our invention—

1. In a system of electrical distribution, the combination of an alternator, a transformer, translating devices, in circuit therewith, and means energized by an alternating current from the secondary coil of the transformer for breaking the circuit of said coil upon the cutting out of said translating devices.

2. In a system of electrical distribution, the combination of an alternator, a transformer, translating devices in circuit therewith, means energized by an alternating current from the secondary coil of the transformer for breaking the circuit of said coil upon the cutting out of said translating devices, and a controller for said means for breaking the circuit thereof upon including one of the translating devices in circuit with said coil.

3. In a system of electrical distribution, the combination of an alternator, a transformer in circuit therewith, a cut-out magnet for switching out the transformer, and adapted to be energized by the alternating current from the transformer, a local generator 2, and a solenoid 4, adapted to be energized by said generator, for switching in the primary and secondary coils of said transformer.

4. In a system of electrical distribution, the combination of an alternator, a transformer, translating devices in circuit therewith, means energized by an alternating current from the secondary coil of the transformer for breaking the circuit of said coil upon the cutting out of said translating devices, said means consisting of a solenoid, a core therefor, and snap cut-out switches for the primary and secondary coils of said transformer, and governed by said core.

5. In a system of electrical distribution, the combination of an alternator, a transformer, translating devices in circuit therewith, means energized by an alternating current from the secondary coil of the transformer for breaking the circuit of said coil upon the cutting out of said translating devices, said means consisting of a solenoid, a core therefor, snap cut-out switches for the primary and secondary coils of said transformer, and governed by said core, said switch having an extension provided with a hole, a reduced portion of said core extending through said hole and so disposed that the extension bears upward against a shoulder on said core, a head to the reduced portion beyond the extension as measured from said shoulder, a coil-spring surrounding said reduced portion, and reaching from said head to said extension, said spring being adapted to have its convolutions jammed against one another at the same instant that the cut-out opens, the spring recoiling at the next instant to rapidly separate the cut-out terminals beyond the sparking distance.

6. In a system of electrical distribution, the combination of an alternator, a transformer, translating devices in circuit therewith, means energized by an alternating current from the secondary coil of the transformer for breaking the circuit of said coil upon the cutting out of said translating devices, said means consisting of a solenoid, a core therefor, snap cut-out switches for the primary and secondary coils of said transformer, and governed by said core, a collar on the core, a catch for holding the collar and core up to within attractive distance of said solenoid, a spring tending to force said collar below said catch, and an electromagnetic device for releasing said catch from said collar, and actuated by a current obtained by closing a translating device, whose terminals are connected to the opposite poles of the secondary coil of said transformer.

Signed this 5th day of November, 1904.

DE WITT C. CONKLING. [L. S.]
JOHN E. WINN. [L. S.]

Witnesses:
JOHN B. MONAHAN,
W. H. CRAWFORD.